United States Patent
Zverkov et al.

(10) Patent No.: US 12,556,576 B2
(45) Date of Patent: *Feb. 17, 2026

(54) METHOD AND DEVICE FOR CLUSTERING PHISHING WEB RESOURCES BASED ON VISUAL CONTENT IMAGE

(71) Applicant: GROUP-IB GLOBAL PRIVATE LIMITED, Singapore (SG)

(72) Inventors: Boris Zverkov, Tula (RU); Nikolay Prudkovskiy, Moscow (RU)

(73) Assignee: GROUP-IB GLOBAL PRIVATE LIMITED, Singapore (SG)

( * ) Notice: Subject to any disclaimer, the term of this patent is extended or adjusted under 35 U.S.C. 154(b) by 905 days.

This patent is subject to a terminal disclaimer.

(21) Appl. No.: 17/749,368

(22) Filed: May 20, 2022

(65) Prior Publication Data

US 2022/0377108 A1   Nov. 24, 2022

(30) Foreign Application Priority Data

May 20, 2021  (RU) ............................ RU2021114210

(51) Int. Cl.
*H04L 29/06* (2006.01)
*G06V 10/74* (2022.01)
(Continued)

(52) U.S. Cl.
CPC ........ *H04L 63/1483* (2013.01); *G06V 10/752* (2022.01); *G06V 10/761* (2022.01); *G06V 10/762* (2022.01)

(58) Field of Classification Search
CPC .............. H04L 63/1483; G06V 10/762; G06V 10/761; G06V 10/752
See application file for complete search history.

(56) References Cited

U.S. PATENT DOCUMENTS

| 5,949,913 A | 9/1999 | Shimazu et al. |
| 6,778,703 B1 | 8/2004 | Zlotnick |

(Continued)

FOREIGN PATENT DOCUMENTS

| CN | 101826105 B | 6/2013 |
| RU | 2637477 C1 | 12/2017 |
| RU | 2676247 C1 | 12/2018 |

OTHER PUBLICATIONS

Search Report with regard to the counterpart NL Patent Application No. 2031940 completed Feb. 23, 2023.

(Continued)

*Primary Examiner* — Wasika Nipa
(74) *Attorney, Agent, or Firm* — BCF LLP

(57) ABSTRACT

A method for clustering phishing web resources based on visual content image, executed on a computer device comprising at least a processor and memory, and the method comprises the following steps: receiving references to a set of phishing web resources; retrieving at least one image of the visual content of each web resource of the set; processing the content of each visual content image associated with one of the set web resources, while contouring the elements on each image of the phishing web resource visual content; filtering the identified contours in each visual content image by removing the identical contours; combining the web resource associated with the compared contours and the cluster based on pairwise comparison of the identified contours and cluster contours, wherein, if the similarity value overrides the threshold value, otherwise, creating a new cluster for the web resource; storing references to web resources associated with corresponding contours of the content from a set of specified clusters in a database.

18 Claims, 7 Drawing Sheets

(51) Int. Cl.
*G06V 10/75* (2022.01)
*G06V 10/762* (2022.01)
*H04L 9/40* (2022.01)

(56) References Cited

U.S. PATENT DOCUMENTS

| | | |
|---|---|---|
| 8,381,292 B1 | 2/2013 | Warner et al. |
| 8,856,937 B1 | 10/2014 | Wüest et al. |
| 10,200,381 B2 | 2/2019 | Hunt et al. |
| 11,601,460 B1 | 3/2023 | Hunt |
| 2007/0078846 A1 | 4/2007 | Iwanaga et al. |
| 2010/0095375 A1 | 4/2010 | Krishnamurthy et al. |
| 2010/0131499 A1 | 5/2010 | Van et al. |
| 2010/0186088 A1* | 7/2010 | Banerjee ............ H04L 63/1433 709/224 |
| 2014/0294316 A1 | 10/2014 | Allamsetty |
| 2014/0359760 A1 | 12/2014 | Gupta et al. |
| 2015/0067839 A1 | 3/2015 | Wardman et al. |
| 2018/0115584 A1 | 4/2018 | Alhumaisan et al. |
| 2018/0349722 A1 | 12/2018 | Chiang et al. |
| 2019/0089910 A1 | 3/2019 | Banik et al. |
| 2019/0222609 A1* | 7/2019 | Slipenchuk ......... H04L 63/1416 |
| 2020/0036751 A1 | 1/2020 | Kohavi |
| 2021/0312651 A1 | 10/2021 | Wang |
| 2022/0036614 A1 | 2/2022 | Lim et al. |

OTHER PUBLICATIONS

Zhao et al., "A Review of Computer Vision Methods in Network Security", arxiv.org, Cornell University Library, 2020, pp. 1-37.
Office Action with regard to te counterpart U.S. Appl. No. 17/861,323 issued Sep. 30, 2024.

* cited by examiner

METHOD AND DEVICE FOR CLUSTERING PHISHING WEB RESOURCES BASED ON VISUAL CONTENT IMAGE

FIELD

This technical solution relates to the field of computing, in particular to the field of information security, namely, to a method and a computing device for clustering phishing web resources based on visual content image for further attribution of phishing websites, mirrors, blocked and/or illegal websites.

BACKGROUND

Phishing sites are one of the most widespread types of malicious web resources. Their main purpose is obtaining confidential user data to commit fraudulent acts.

The principle of phishing sites operation is copying or imitation of existing services of any brands, for example, banks, payment systems, e-mail, social networks or trademarks to obtain confidential data voluntarily from a user (login, password, e-mail, name, ID document number, payment card details, etc.).

For example, but not limited to, this could be a phishing remote banking site where a user is encouraged by various psychological tricks to enter login data and/or provide additional confidential information. After that, the obtained information is used by phishers for stealing user funds or other illegal actions.

It is worth noting that imitation of real services could also be carried out with the purpose of making money on advertising, displaying untrustworthy or banned information, as well as in case of an official resource mirror—for illegal distribution of copyrighted or banned content. All described actions may damage business reputation of the original web resource owners or provide illegal access to unsuitable content.

Phishing distribution techniques allow to create many same type sites using so-called phishing kits, which complicates their timely detection and blocking.

A phishing kit is an archive file comprising scripts required for creation and operation of a phishing site. Such a tool allows phishers without deep programming skills to deploy hundreds of phishing pages quickly, often using them as "mirrors" of each other. When such site is blocked, the phisher activates another one, when this one is blocked, the next one, and so on. Thus, a phishing kit allows attackers to resume operation of malicious resources quickly, ensuring their own invulnerability. This explains the interest in them among cyber security experts. Detecting phishing kits allows not only to find hundreds or even thousands of phishing pages, but what is more important, it could serve as a starting point for investigations in order to identify their developers and bring them to justice.

It is worth noting that in order to attract buyers, the developers of phishing kits use well-known brands with a large audience, which, in theory, should make it easier for future owners of such kits to implement fraudulent schemes. In 2020, the brands most frequently used in phishing kits were Amazon, Google, Instagram, Office 365, and PayPal, while Exploit, OGUsers and Crimenetwork were in top 3 online phishing kits markets.

At its simplest, phishing web resources are identified by comparing URL to databases of compromised URLs. More sophisticated methods could be based on the analysis of the page structural elements.

U.S. Pat. No. 8,856,937 (publ. Jul. 10, 2014) discloses a method and a system for identifying malicious web resources. This known method includes creating and updating a web resource database comprising legitimate web resources, suspicious web resources and malicious web resources. Web resources are classified based on comparing web resource screenshots to legitimate and phishing web resources contained in the database.

CN 101826105 B (publ. Feb. 5, 2019) discloses a method for detecting phishing pages based on matching web page elements, namely, calculating the optimal correspondence of graphs to search matching pairs of functions among various signatures of web pages. The method is also characterized by determining internal weights of text features, image characteristics by determining relative weights among text similarity, and images when calculating web pages similarity using logarithmic regression analysis.

In order to speed up the process of identifying malicious web resources, which could be performed using, for example, the systems and methods disclosed in the above prior art documents, web resource clusters could be formed comprising a selection of web resources which further are analyzed to identify, for example, web resources involved in phishing, among them.

U.S. Pat. No. 10,200,381 B2 (publ. Feb. 5, 2019) and U.S. Pat. No. 8,381,292 B1 (publ. Feb. 19, 2013) disclose the methods of protecting a brand from phishing by comparing the profiles of a potentially phishing resource to the basic (required) templates of brand web pages.

One of the disadvantages of the known devices and methods for clustering web resources, for example, disclosed in the source US 2015/0067839 (publ. Mar. 5, 2015), consists in excessive number of analyzed suspicious web resources contained in the obtained clusters, which in turn causes excessive labor intensity and/or resource consumption for checking all these suspicious web resources in the obtained clusters to identify among them the web resources that are copies of the original web resources or comprising at least some elements of the original web resource content, with their subsequent analysis for involvement in phishing activities.

Preparation of target web resource clusters, in which the web resources are highly likely to be copies of an original web resource and are involved, for example, in phishing activities, is an important aspect for improving speed and accuracy of identifying malicious web resources. Many known technical solutions are designed for the maximum accurate preparation of target clusters of web resources, however, as noted above, these known technical solutions have some disadvantages and require improvement.

The prior art also discloses the solution RU 2676247 C1 (publ. Dec. 26, 2018), selected as a prototype, which solves the problem of automated filtering of an array of suspicious web resources to identify essentially all phishing web resources duplicating at least part of the content from a specific original web resource owing to an ability of creating a database comprising only the assumed phishing web resources, each of which could be further automatically and/or manually analyzed for being involved in malicious phishing-related activities. Automated filtration of the entire array of the identified suspicious web resources, in turn, enables to reduce significantly the computing resources of a computer device and its memory resources required for identifying involvement of the analyzed web resources in malicious actions related to phishing, due to the fact that not the entire array of suspicious web resources is subject to analysis, but only a limited set of web resources associated with the original web resource and highly likely to be related to phishing due to duplicating content of the original web resource being legitimate.

However, the said solution is aimed at clustering based on the elements retrieved during collection from the page, in contrast to this solution, where the elements are retrieved from the web resource image, that enables to improve accuracy of approach, since different phishing pages using different brands could have the same script (JavaScript) or the same icon, or the same signatures in the HTML code. The advantage is that already rendered content is subject to analysis, that is, the content obtained after the browser has performed certain steps to convert HTML, CSS and JavaScript into a visual image, but not the code data. This approach results in decreasing the frequency of false responses.

Thus, in future, it is necessary to improve devices and methods for clustering web resources, in particular for preparation of such web resource clusters that would reduce labor intensity and/or resource consumption of their subsequent checking for involvement, for example, in phishing, by using advanced computer vision technology in combination with an advanced clustering algorithm.

Therefore, this technical solution is created to overcome at least one of the above-mentioned disadvantages of the known devices and methods for clustering content of phishing web resources.

SUMMARY

The technical problem to be solved by the claimed solution is creation of a method and computing device for clustering phishing web resources based on visual content image. Additional variants of this technique implementation are presented in the dependent claims.

The technical result consists in improving accuracy of clustering phishing web resources based on visual content image.

The claimed result is achieved by implementing a method for clustering phishing web resources based on visual content image, executed on a computer device comprising at least a processor and memory, and the method comprises the steps of:
 receiving references to a set of phishing web resources;
 retrieving at least one image of the visual content of each web resource of the set;
 processing the content of each visual content image associated with one of the set web resources, while
  contouring the elements on each image of the phishing web resource visual content;
  filtering the identified contours in each visual content image by removing the identical contours;
  combining the web resource associated with the compared contours and the cluster based on pairwise comparison of the identified contours and cluster contours,
  wherein, if the similarity value overrides the threshold value,
  otherwise, creating a new cluster for the web resource;
 storing references to web resources associated with corresponding contours of the content from a set of specified clusters in a database.

In the specific embodiment of the described method, a set of web resources includes at least two web resources.

In the specific embodiment of the described method a network is preliminary scanned for obtaining references to the set of web resources.

In the specific embodiment of the described method the references to the set of web resources are obtained, at least partially, from an external source via a data transmission network.

In the specific embodiment of the described method the references to the set of web resources are obtained from the preliminary-formed web resource database.

In the specific embodiment of the described method there are at least the following contours of elements contained in the visual content image: logos, letter outlines, individual words, pictures, forms.

In the specific embodiment of the described method at least the following methods are used for contour extraction: Canny edge detector and contour tracing algorithm.

In the specific embodiment of the described method when processing the content of each obtained visual content image, small-size, oblique and elongated contours are additionally removed.

In the specific embodiment of the described method the identified contours are filtered in each visual content image by removing similar contours, and if the compared contours differ in height and/or width by more than two pixels, they are considered to be different In the specific embodiment of the described method the identified contours are filtered in each visual content image by removing similar contours, and
 if the compared contours differ in height and/or width by two pixels or less, then
  the contours are overlapped, and
  calculating per-pixel difference of the images,
 wherein, a similarity score is calculated for the resultant differential image within the range from 0, where the images are the same, to 100, where the images are completely opposite,
 wherein, the similarity score (P) is calculated as the arithmetic mean of pixel values, that is, the sum of pixel values divided by the number of image pixels, and calculated for the values taken from all three RGB channels:

$$P = \frac{\sum_{i=1}^{N} Ri + \sum_{i=1}^{N} Gi + \sum_{i=1}^{N} Bi}{N},$$

where Ri, Gi, Bi—i-th pixel value in R, G and B channels, respectively, and N—total number of image pixels,
 wherein, the contours which similarity score does not exceed 7 are removed.

In the specific embodiment of the described method, invariant visual hash functions are additionally calculated for each contour identified in the visual content image In the specific embodiment of the described method, if, when comparing with the cluster images, less than three similar contours are found in the image of the phishing web resource visual content, then an undescriptive image message is displayed, and in this case, a new visual content image is not added to the cluster, and if there are less than two images in the cluster, the cluster is deleted;

if the comparison reveals from three to five similar contours, then, in order to add an image of the phishing web resource visual content to a specific cluster, all the cluster contours should match exactly;

if the comparison reveals from five to ten similar contours, then, in order to add an image of the visual content of a phishing web resource to a specific cluster, half of the contours must match with the cluster contours, if the comparison reveals from ten to fifteen similar contours, then, in order to add an image of the phishing web resource visual content to a specific cluster, a quarter of the cluster contours should match, if the comparison reveals minimum fifteen similar contours, then, in order to add an image of the phishing web resource visual content to a specific cluster, at least one fifth of the cluster contours should match.

In the specific embodiment of the described method, when attributing an image of the phishing web resource visual content to several clusters, it is added to a cluster with the largest number of contour matches.

In the specific embodiment of the described method after clustering each of the images of the phishing web resource visual content set, the clusters containing less than three images are additionally deleted.

In the specific embodiment of the described method the images contained in the remote clusters are entered into a special list and are temporarily considered as garbage.

In the specific embodiment of the described method an adjacency matrix is additionally created based on each image of the visual content contained in the list, where the number of matching contours is located at the intersection, in order to identify a list of pairs of contours similar in size.

In the specific embodiment of the described method, additionally, to determine the association of at least two images of web resource visual content in the adjacency matrix, the value is changed to 0, if the number of size-matching contours is less than a predetermined threshold, or to 1, if the number of contour matches is more than a threshold.

In the specific embodiment of the described method the strongly connected graph components, in which there are more than two images, are computed, and a new cluster is created for each of the identified components.

The claimed result is also achieved by implementing a computing device for clustering phishing content, comprising a memory for storing machine-readable instructions and at least one computing processor configured to execute machine-readable instructions to ensure implementation of the method for clustering phishing content.

DESCRIPTION OF THE DRAWINGS

Implementation of the technique will be further described in accordance with the attached drawings, which are presented to clarify the technique chief matter and by no means limit the field of the technique. The following drawings are attached to the application.

DETAILED DESCRIPTION

Figure 1:
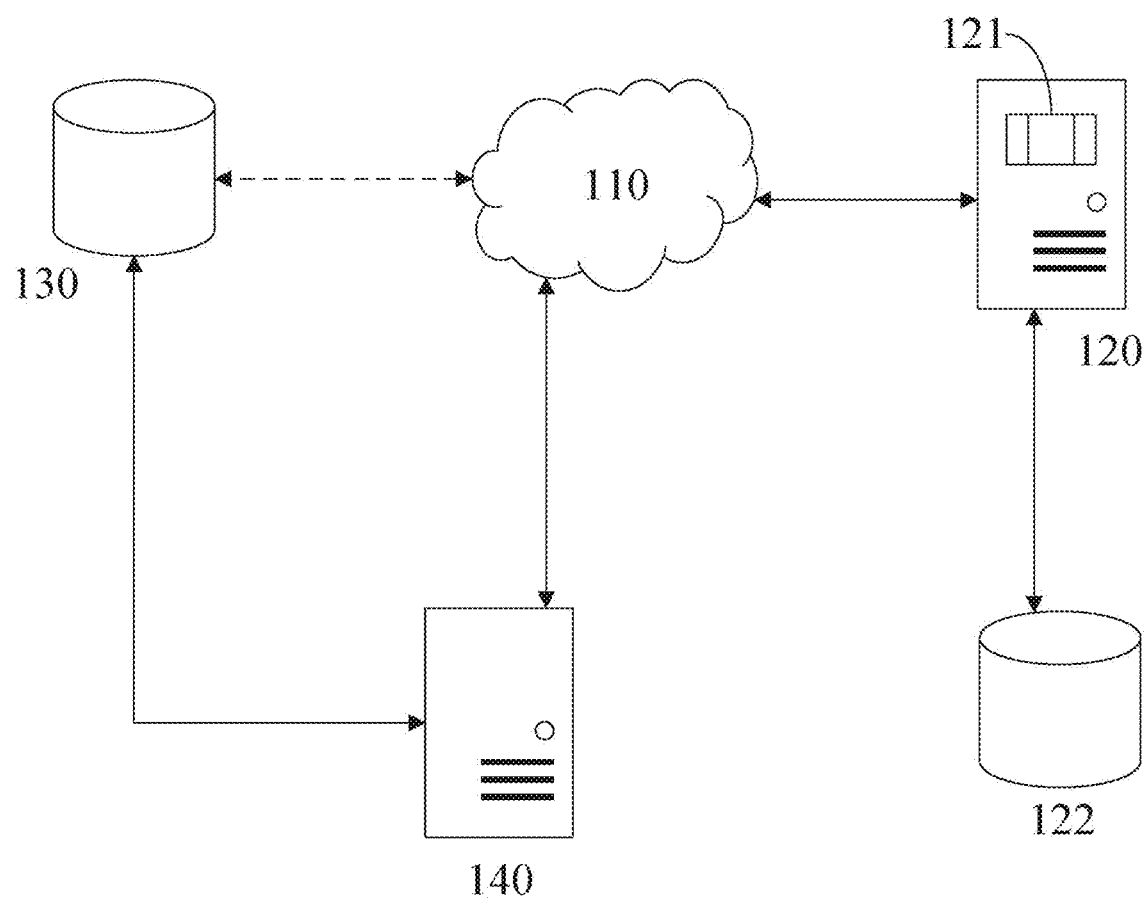
FIG. 1 illustrates a simplified schematic diagram of one of non-limiting embodiments of the system implementing the present technical solution.

Numerous implementation details intended to ensure clear understanding of this technique are given in the detailed technique specification below. However, it is obvious to a person skilled in the art how to use this technique as with the given implementation details as without them. In other cases, the well-known methods, procedures and components have not been described in detail so as not to obscure unnecessarily the present technique.

Besides, it will be clear from the given explanation that the technique is not limited to the given embodiment. Numerous possible modifications, changes, variations and replacements retaining the chief matter and form of this technique will be obvious to persons skilled in the art.

Note that, in the context of the present specification, unless specifically stated otherwise, the term "content element" or "content" refers to any data that could be represented (visually, in audio format, or in some other way) that a web resource could comprise. Thus, for the purposes of this technical solution, a content element could be, in particular, a font, menu item, web resource template, fill-out form, written text, image, part of the image, graphics, animation, video, music, voice record, and so on, and also any combination thereof. In particular, any other resources that can be transferred via http/https protocols are also content.

Additionally, the present specification discloses the term image of the web resource visual content, which means a screenshot, that is, an image obtained by a computing device and showing exactly what the user sees on the screen of a monitor or other visual output device.

Contours (boxes)—rectangular elements, for example, buttons, input fields, company logos, title blocks, etc. highlighted in the visual content image, that is, in the screenshot.

Clusters are groups of visual content images (screenshots), formed on the basis of matching the unique contours (boxes) identified on them, for a specific phishing set. A set of links (references) to phishing pages corresponding to the visual content images and having much in common (for example, directed to one specific company or similar to each other in landing), is also associated with each cluster, for example, stored in a database with a reference to a specific cluster.

In the context of the present specification, unless clearly specified otherwise, an "locator" or "reference" to an information element could be the information element itself or locator, reference, link or other indirect method enabling the recipient of the reference to find a network, memory, database or other computer-readable medium from which the information element can be retrieved. For example, a web resource locator could include the file itself or a set of web resource files, or it could be a universal resource locator (for example, URL such as www.webpage.com) identifying a web resource with respect to a particular network (in particular, the Internet), or it could by some other means transmit to the recipient a reference to a network folder, memory address, table in a database or other place where one can access a web resource or its individual content elements. Those skilled in the art would appreciated that the accuracy degree required for such reference depends on the degree of initial understanding of how the information exchanged between the reference recipient and sender should be interpreted. For example, if prior to data transfer between the sender and the recipient, it is clear that the information element locator takes the form of a uniform resource locator URL, transfer of the locator, link to a given web resource—is all that is required for efficient transfer of the web resource to the recipient, despite the fact that the information element itself (for example, a web resource or its individual content element) has not been transferred between the reference sender and the recipient.

In the context of the present specification, unless clearly specified otherwise, the words the "first", the "second", the "third", etc. are used as adjectives solely to distinguish the nouns which they refer to from each other, and not for the purposes of describing any specific relationship between these nouns. Thus, for example, it should be kept in mind that the use of the terms the "first web resource" and the "third web resource" does not imply any order, assignment to a particular type, history, hierarchy or ranking (for example) of web resources in the web resource set, as well as their use (in itself) does not imply that some "second web resource" must necessarily exist in a particular situation. Hereinafter, as specified here in other contexts, the reference to the "first" element and the "second" element does not exclude a possibility that it is one and the same actual real element. Thus, for example, in some cases, the "first" server and the "second" server may be one and the same software and/or hardware, and in other cases they may be different software and/or hardware.

Additional and/or alternative characteristics, aspects and advantages of embodiments of this technical solution will become obvious from the following specification, attached drawings and claims.

FIG. 1 illustrates a simplified schematic diagram of one of non-limiting embodiments of the phishing content clustering system 100 for implementing this technical solution.

In some non-limiting embodiments of the present technical solution, the system 100 implementing the method may include a data transmission network 110, at least one computing device 120 for detecting malicious web resources, and a database 130.

The system 100 may also include at least one search server 140 that has access to the web resource database 130.

In the other non-limiting embodiment of the present technique, the system 100 may additionally include active network equipment (not shown) and a client device (not shown).

The Internet or any other computer network could be used as the data transmission network 110.

The computing device 120 could be a conventional computer server. In an exemplary embodiment of this technical solution, the device 120 could be Dell™ PowerEdge™ server, or it could be any other suitable hardware and/or application software and/or system software, or a combination thereof.

Possible embodiments of the computing device 120 are well known. Thus, it is sufficient to note that the device 120 includes, but not limited to, a network communication interface (e.g. modem, network card, etc.) for two-way communication over a data transmission network (not shown); and the processor 121 connected to the network communication interface, with the processor 121 being configured to execute various algorithms, including those described below. For this purpose, the processor 121 could have access to the computer-readable instructions stored in a computer-readable medium (not shown), the execution of which causes the processor 121 to implement various procedures, described hereinafter.

In some embodiments of this technical solution, the computing device 120 includes at least one database 122 that is configured to store at least part of references to content elements, content elements, group of content elements, and a reference to web resources associated with the corresponding content element or group of content elements. Thus, by way of example, a web resource that contains all the content elements from the group of content elements is associated with that group of content elements.

It is worth noting that the database 122 could be implemented as part of the computing device 120 or otherwise be accessible for the computing device 120.

An embodiment of the system 100 is possible, according to which the computing device 120 includes a computer-readable medium (not shown) where computer-readable instructions and/or database 122 could be preliminarily stored. Alternatively or additionally, the device 120 could have access to the computer readable instructions and/or database 122 located in the other equipment. The way in which the processor 121 of the computing device 120 accesses the computer readable instructions and the database 122 is not a limiting condition of this technical solution.

The processor 121 is configured to receive references to a set of web resources. By way of non-limiting example, receiving references to a set of web resources could be receiving a list of uniform resource locators (URLs). Additionally, it is worth noting that the sources of references to a set of web resources could be different.

An embodiment of this technical solution is possible, in which the processor 121 is configured to receive a reference to a set of web resources at least in part from an external source over the data transmission network 110. For example, the external source could be a search server 140 accessing the web resource database 130 and/or malicious web resource data collection server (not shown), etc. Moreover, the computing device 120 could access the web resource database 130 over the data transmission network 110. Alternatively or additionally, the external source could be a web resource that includes references to a set of web resources (for example, a verified database of phishing web resources like Google Safe Browsing (GSB), OpenPhish (OP). It is worth noting that the way in which and by what principle the references to web resources are grouped in the external source, in particular, in the web resource database 130, is not a limiting condition.

Embodiments of the search server 140 are well known. Thus, it is sufficient to note that the search server 140 includes, but not limited to, a network communication interface (e.g., a modem, a network card, and the like) for two-way communication over a data transmission network 110; and a processor (not shown) connected to the network communication interface, with the processor being configured to search for web resources in the data transmission network 110 and to store them in the database 130. For this purpose, the processor of the search server could have access to corresponding computer-readable instructions stored in a computer-readable medium (not shown).

Thus, the process of population and storing the web resource database 130 is generally known as data collection (or crawling), wherein the search server 140 is configured to browse various web resources available over the data transmission network 110, and store them in the web resources database 130 according to one or more predefined parameters. By way of non-limiting example, the search server 140 may scan the data transmission network 110 and store any new and updated web resources, and thus collect the complete web resource base 130 of the data transmission network, and/or collect web resources, for example, including certain keywords in one or more languages. Since malicious web resources (in particular, phishing websites) usually try to imitate the websites of banks, payment systems and e-mail services, the keywords could be, for example, but not limited to: "bank", "credit", "card", etc. The search could also be carried out by domain names and/or other parameters. Identified and selected references to web resources are stored in the web resource database 130, after that they could be received by the processor of the computing device 120 over the data transmission network 110 from the search server 140.

Moreover, the search server 140 is configured to explore at least part of the content elements of each web resource from a set of web resources. Web resource content elements could be files of content elements and/or hash sums of content element files (e.g. hash sums computed by sha256 algorithm) Format of content element files is not specifically limited and will depend on the type of specific content element. For example, in case, where the content element is an image, the file could be presented, in particular, in one of the following formats: "jpg", "jpeg", "png", "bmp", "gif", etc. In case, where the content element is a text, the file could be presented, in particular, in one of the following formats: "txt", "doc", "html", etc. In case, where the content element is a font, the file could be presented, in particular, in one of the following formats: "woff", "ttf," eot ",", svg", etc. In case, where the content element is a script, the file could be presented, in particular, in one of the following formats: "asp", "aspx", "php", "jsp", "cgi", etc. In case, where the content element is animation or video, the file could be presented, in particular, in one of the following formats: "fly", "swf", "avi", "mp4", "mov", etc. In case, where the content element is a cascading style sheet, the file could be presented, in particular, in "css" format. The specified list of possible content elements and formats in which they could be presented is not a limiting condition of this technical solution.

The extraction of elements, and also creation of visual content images (screenshots) of the identified web resources could be executed by the processor of the search server 140 using specially written scenarios and/or scripts for browsers.

Besides, it is worth noting that in the other non-limiting embodiment of this technique, the described function of creating visual content images could be performed by the computing device 120.

In one of the specific embodiments of this technique, the visual content image (screenshot) could be obtained by using Selenium WebDriver, a tool for automating the actions of web browser using<.save_screenshot (filename)> or <.get_screenshot_as_file (filename)> method and be stored in the database 122.

Alternatively, an embodiment of this technical solution is possible, in which the processor 121 of the computing device 120 is configured to receive a reference to a set of web resources directly from the preformed web resource database 130. Moreover, the preformed web resource database 130 could be accessible for the computing device 120 over the network.

An embodiment of this technical solution is possible, in which the processor 121 is configured to scan the network 110 for receiving references to a set of web resources, and thus, the computing device 120 can perform the functions of the search server 140 described above. For example, network scanning could be performed by IP addresses of web resources, domain names, keywords and other parameters.

The processor 121 of the computing device 120 is configured to process the obtained elements and also images of the web resource visual content for clustering phishing content, and also to group them based on the specific similarity threshold values.

Figure 2:
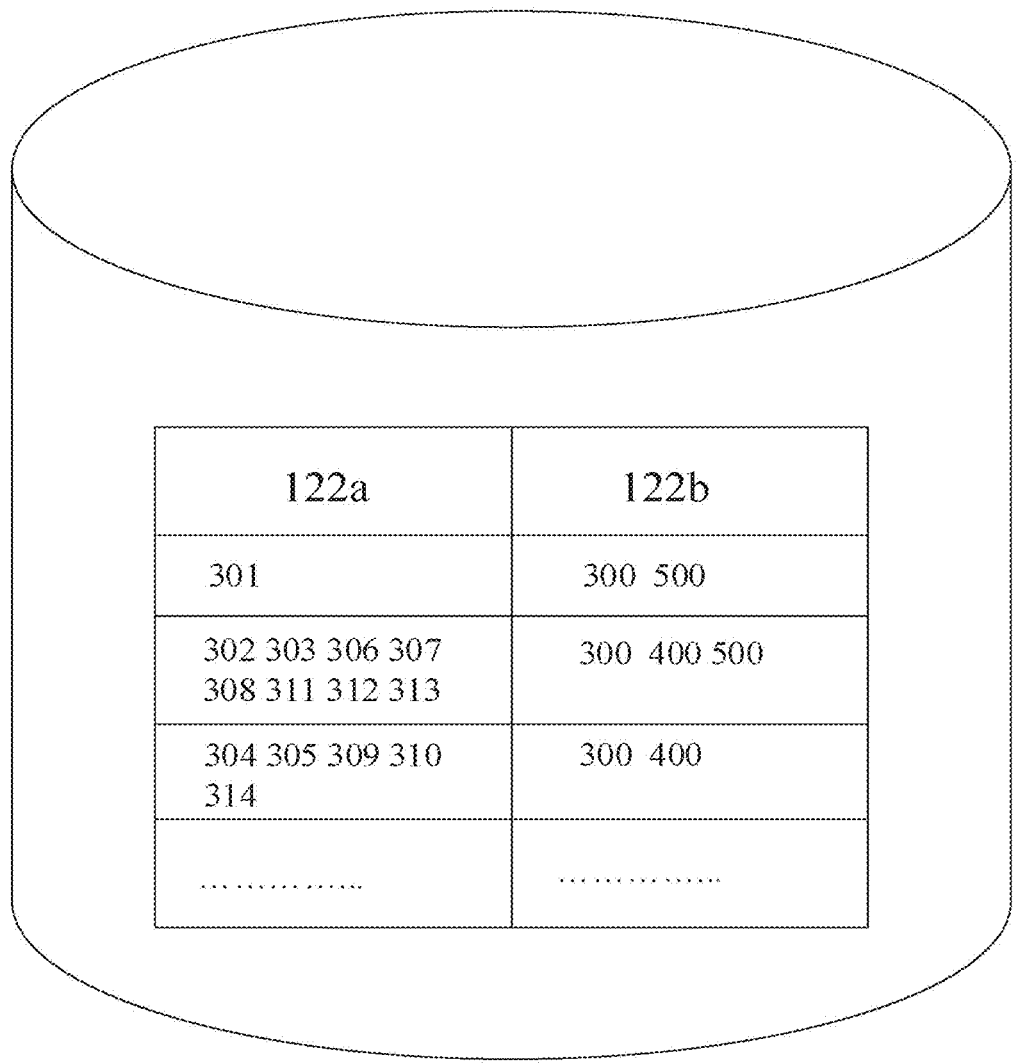
FIG. 2 illustrates one of non-limiting embodiments for representing information of web page resources in a resource database.

FIG. 2 shows an illustrative example of the database 122 comprising data on contours of content elements (122a) and web resources (122b) associated with the corresponding contours of content elements.

In the illustrative example of the database 122 there is the cluster of associated web resources 300, 400, 500 based on the identified element boxes 302, 303, 306, 307, 308, 311, 312, 313.

It should be noted that the quantity and quality of the database 122 population is not limited in any way, the given examples of content element boxes and associated web resources are only for purposes of understanding this technical solution and are not limiting. It is obvious, that populating the database 122 could be much more complex.

Figure 3:
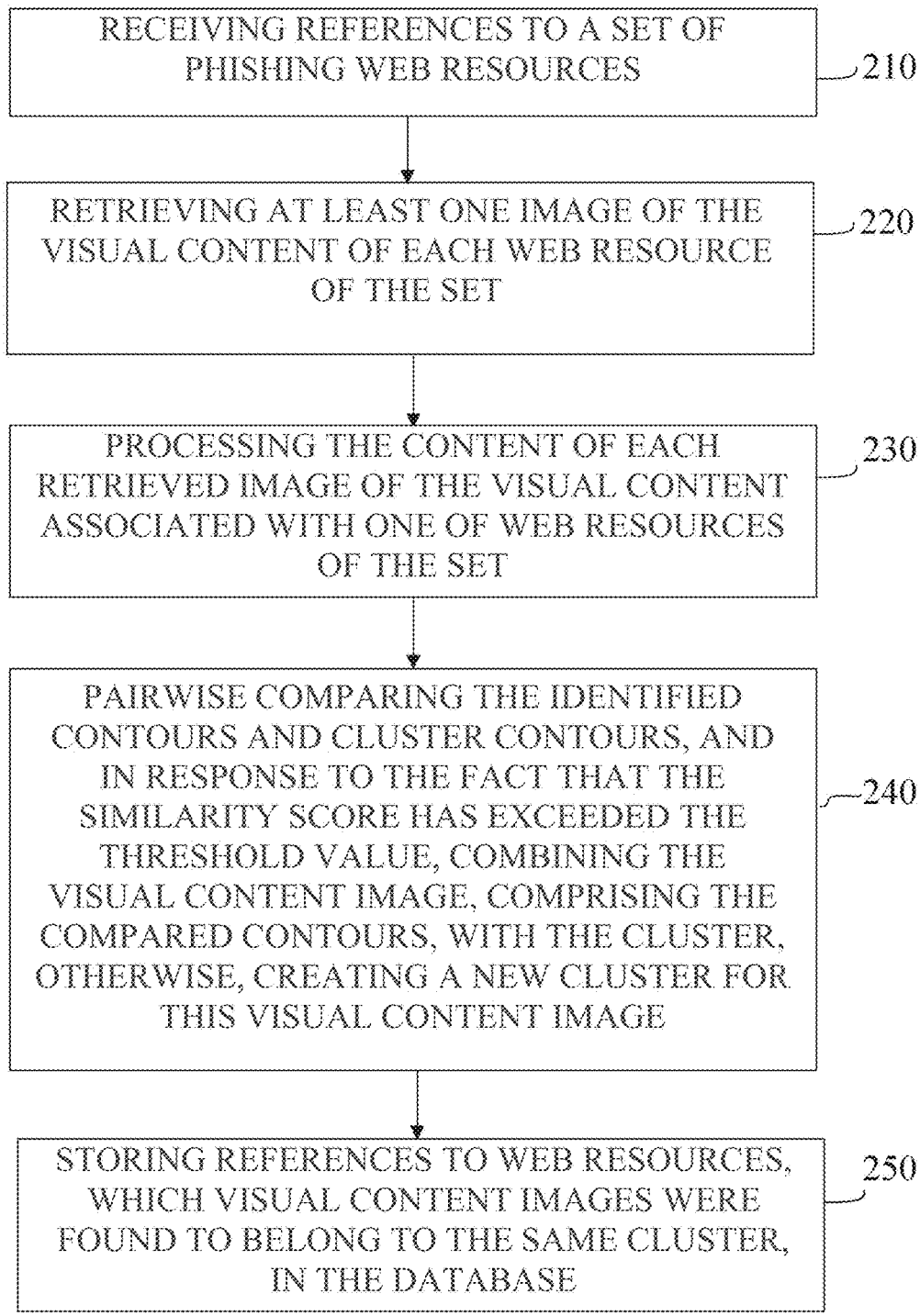
FIG. 3 illustrates a flow diagram according to the aspect of the present method for clustering phishing web resources based on visual content image.

Then, with reference to FIG. 3, the claimed method for clustering phishing web resources based on visual content image, which is performed in accordance with non-limiting embodiments of this technical solution (200), will be considered in more detail.

The method 200 may be performed in the computing device 120, and more specifically, by its processor 121, in accordance with a non-limiting embodiment of the system 100 illustrated in FIG. 1. Also with reference to FIG. 4, FIG. 5 and FIG. 6, let us consider an illustrative embodiment of the method.

Figure 4:
FIG. 4 illustrates a non-limiting example of the first web resource.

FIG. 4 illustrates an example of a virtual content image in respect to the web resource 300 including a set of dedicated contours 301-314. At the same time, the contours 302-306 represent a button element for redirecting from this resource to some third-party resource, the contours of the elements 301, 307-311 represent brand logos, the contours 312-313—characters, and 314—dedicated rectangular area comprising the rest of the elements.

Figure 5:
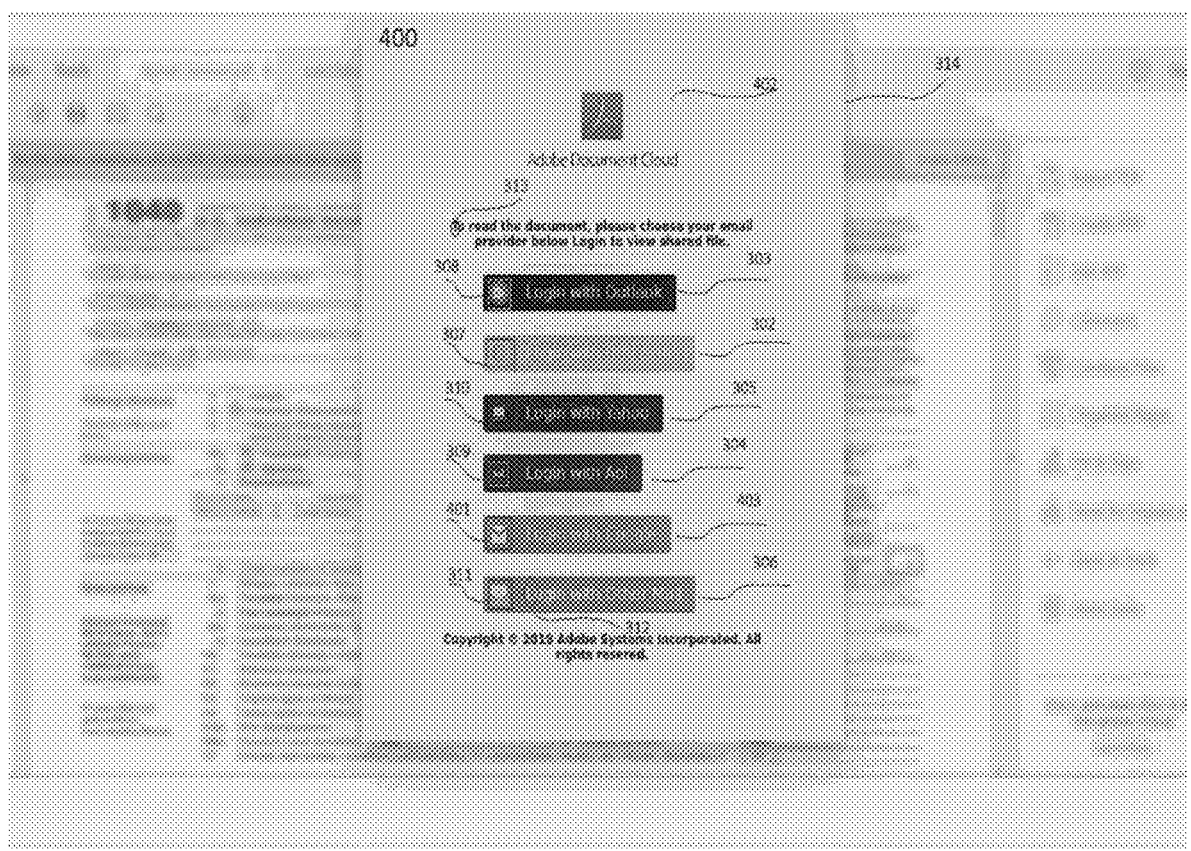
FIG. 5 illustrates a non-limiting example of the second web resource.

FIG. 5 illustrates an example of a virtual content image of the second web resource 400 including a set of content elements. Moreover, some contours of the content elements, namely 302-314, are also present in the first web resource 300 and are described above. Additionally, the web resource 400 comprises elements 401, 402, 403.

Figure 6:
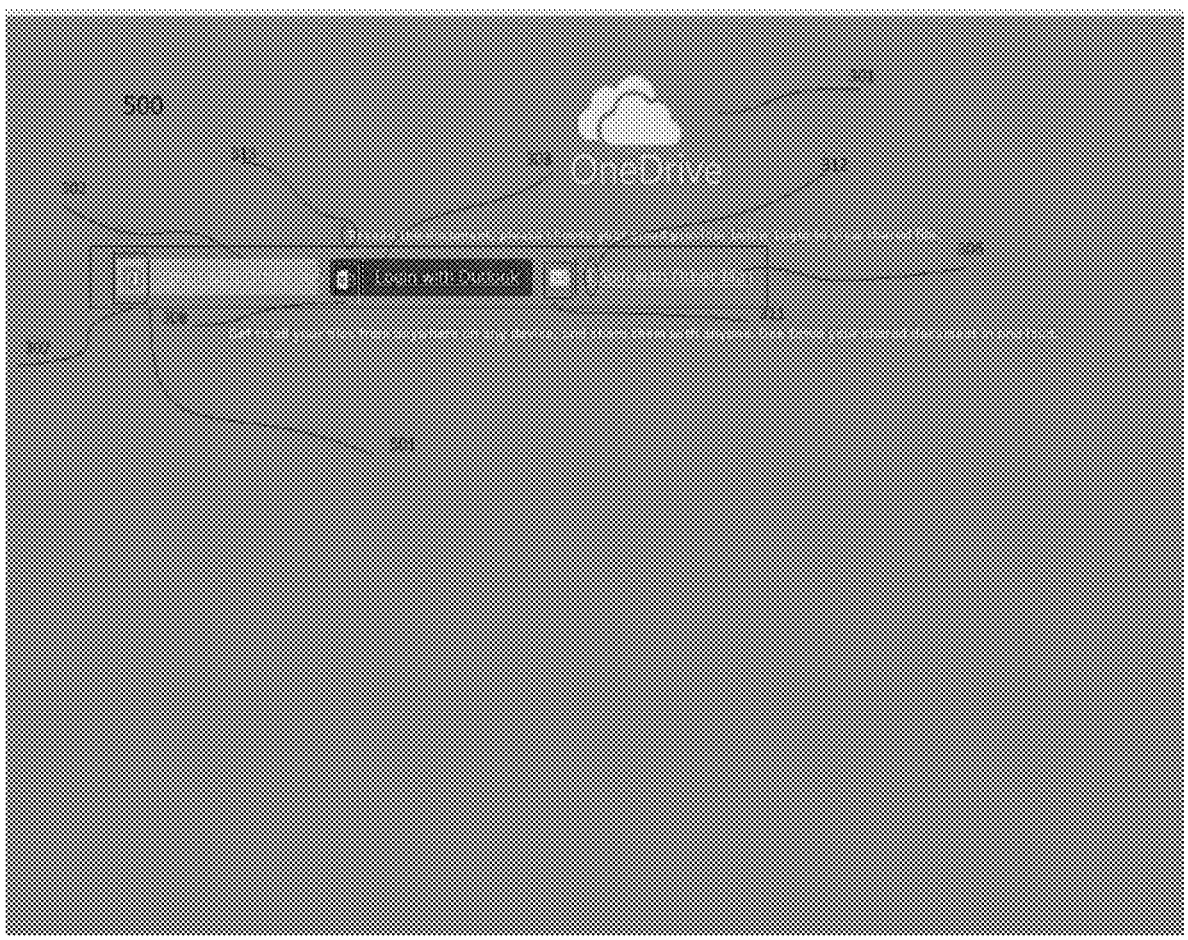
FIG. 6 illustrates a non-limiting example of the third web resource.

FIG. 6 illustrates an example of the third web resource 500, including content elements, in particular, 301, 302, 303, 306, 307, 308, 311, 312, 313, 501. Content elements 302, 303, 306, 307, 308, 311 312, 313, which are also present in the first and second web resource, and also 301 associated only with the first web resource, have been described above. Content element 501 is a string comprising buttons to navigate to third-party web resources.

In the context of the present technical solution, the number and kinds of different content elements is not a limiting condition. The web resources in FIG. 4, FIG. 5 and FIG. 6 are presented only as illustrative examples, it is obvious that this technical solution can also be applied to any other web resources that have more or less content elements, wherein, the types of content elements and the content itself may or may not be repeated within one and the same web resource. Some content elements available in the presented illustrative examples of web resources are not numbered.

FIG. 3 illustrates a flowchart in accordance with an aspect of the present method (200) for clustering phishing web resources based on visual content image, which will be disclosed in more detail below.

Step 210 Receiving References to a Set of Fishing Web Resources

Accordingly, the method 200 begins at step 210 where the computing device 120 receives references to at least one web resource comprising phishing content.

References to a set of web resources could be as the web resources themselves, as, for example, links to web resources, URLs, accessible over the data communication network 110 or another network (not shown) for the computing device 120.

In a non-limiting illustrative example the computing device 120 at step 210 receives references to a set of three web resources 300, 400 and 500 from an external source—search server 140 from the web resource database 130. It is worth noting that the web resources 300, 400 and 500 were previously found by the search server 140 and stored in the web resource database 130. Also, references to a set of web resources could be obtained at least in part from the preformed web resource database 130, and additional embodiment of the method 200 is possible, in which the computing device 120 can receive references to a set of web resources directly from the web resource database 130.

Additionally, the other embodiment of the method 200 is possible, in which the computing device 120 scans the data communication network 110 to obtain references to a set of web resources. Scanning of the data communication network 110 could be performed by the computing device 120 similarly with the search server 140, as described above, or otherwise using available software capable of searching according to the specified parameters in the network.

The other embodiment of the method 200 is possible, in which at step 210 a set of web resources is obtained from at least two different sources. For example, references to web resources 300 and 500 are obtained from the search server 140 from the database 130, and web resource 400 is obtained from the other external source (not shown, for example, from a special external database of phishing web resources) over data communication networks 110.

Additional embodiment of the method 200 is also possible, in which the obtained URL leads to a folder with files (for example, js, css, image, etc.), and does not correspond to usual display of web pages, then the system 100 over the network 110 connects to an external service (not shown), for example, to 'scan-open-dir', which examines all the folders found at the specified address, and also returns the result back to the system 100, which, using specially written parsers, processes this information and distributes it in the database 122.

Then the method 200 proceeds to step 220.

Step 220 Retrieving at Least One Image of the Visual Content of Each Web Resource of the Set.

Step 220—retrieving at least one image of the visual content of each web resource of the set.

In non-limiting embodiments of this technique, an image of the visual content could be rendered by the search server 140 and stored in the database 130, or rendered by the processor 121 of the computing device 120 and stored in the database 122 by any well known technique.

In particular, for an illustrative example, such techniques can include use of virtual browsers (eg, Selenium). Extension is installed in the virtual browser settings, cache is cleared, transition to a web resource is performed, then visual content images of this web resource are automatically saved in the specified location. Moreover, any available software, a script written in any programming language and capable of being interpreted by the system for obtaining the desired visual content image, could be used for the same purposes.

Then, after the step of retrieving the visual content image, the method proceeds to step 230.

Step 230 Processing the Content of Each Retrieved Image of the Visual Content Associated with One of Web Resources of the Set.

At this step, there is processing the content of each retrieved image of the visual content associated with one web resource of the set.

This step in a preferred embodiment of the technique described herein includes at least the following substeps:

contouring the elements on each image of the phishing web resource visual content;

filtering the identified contours in each visual content image by removing the identical contours.

At this step, there is contouring of at least the following elements of the visual content image: logos, letter outlines, individual words, pictures, forms. This could be done using Canny edge detector and contour tracing algorithm.

It is worth noting that contours in the visual content image are such curves in the image along which there is sharp change in brightness, colour or other parameters of the image. Therefore, the goals of image conversion into a set of curves are: extraction of the essential image characteristics and reducing the amount of information for subsequent analysis.

Accordingly, during contouring by Canny edge detector, at least the following steps are performed:

removing noise and unnecessary details from the visual content image by applying the Gaussian filter, computing the first derivatives (magnitudes and directions) of the pixel intensity function in horizontal and vertical directions by applying the Sobel operator, selecting pixels that potentially belong to the edge using the non-maximum suppression procedure, wherein, the pixels which the vectors of directional derivatives correspond to, being local maxima, are considered potential candidates for belonging to the edge;

and performing double clipping, that is, highlighting "strong" and "weak" edges, where pixels, which intensity exceeds the maximum threshold, are considered as pixels belonging to the "strong" edges. It is assumed that pixels with intensity in the range from the minimum to the maximum threshold value belong to "weak" edges. Pixels, which intensity is below the minimum threshold, are discarded, excluded from further consideration. The resulting edges comprise pixels of all "strong" edges and those pixels of "weak" edges, whose neighborhood comprises at least one pixel of "strong" edges.

It is worth noting that further the contour tracing algorithm is additionally applied on the visual content image. In this technical solution use of a certain algorithm for tracing image edges is not a limiting factor, therefore, it is possible to use any known method. As an example, such methods can include, but not limited to, Kirsch operator, Robins operator, Marr-Hildreth and Harris algorithms, and also its modifications: Shea-Thomas, Harris-Laplace, etc.

After contouring, small, inclined and highly elongated contours are additionally cleaned off (deleted). It is worth noting as an example, but not limited to, that contours, which are less than 350 pixels, could be considered as small, and contours, which width or height is less than 10 pixels are considered as highly elongated. Contours, which edges are not parallel to sides of the visual content image, are considered as inclined.

The cleaning criteria could be preset by an expert or generated automatically based on statistic data about use of content elements in a set of web resources. For example, if a preset threshold value of the number of web resources associated with a given content element is exceeded, it could be considered as a standard content element. Threshold value can be set manually by operator, or be selected using various automated algorithms, including machine learning ones.

In a preferred embodiment of this technique, the processor 121 of the computing device 120 performs pair-wise comparison of similar contours, wherein:

if the compared contours differ in height and/or width by more than 2 pixels, they are considered to be different;

if the compared contours differ in height and/or width by 2 pixels or less, then the contours are superimposed on each other and the per-pixel difference of contour images is calculated, and a similarity score is calculated for the resultant image within the range from 0, where the images are the same, to 100, where the images are completely different.

wherein, the contours which similarity score does not exceed 7 are removed.

In accordance with the above, the similarity score (P) is calculated as the arithmetic mean of pixel values (1), that is, the sum of pixel values divided by the number of image pixels, and calculated for the values taken from all three RGB channels:

$$P = \frac{\sum_{i=1}^{N} Ri + \sum_{i=1}^{N} Gi + \sum_{i=1}^{N} Bi}{N} \quad (1)$$

where Ri, Gi, Bi—i-th pixel value in R, G and B channels, respectively, and N—total number of image pixels.

It is worth noting that in one embodiment of this technique the scale-invariant visual hash functions are used for each contour identified in the visual content image. Scale-invariant hashing is useful when, for example, one and the same visual content is displayed at different scales on different device hardware and operating systems. These hash functions themselves could be any well-known functions.

In one of the alternative embodiments it is possible to apply the similar contour removal method, wherein:

if the compared contours differ in height or width by more than 2 pixels, they are considered to be different;

if one of the contours is larger than the other one, then, 9 all possible locations of the smaller contour in the larger one are successively compared, difference between the superimposed contours is calculated, the similarity score (1) is calculated for the difference, and the contours, which difference does not exceed the set threshold, are removed.

It is worth noting that when performing the alternative embodiment of this technique, there could be obtained less than 9 locations of one contour in the other one, depending on the difference in one of the coordinates.

In the alternative embodiment of this technical solution, in case when one of the contours is larger than the other one, the difference in width is taken as delta, and at least one location is searched to obtain a per-pixel difference of images with displacements: 0, $$\frac{delta}{2},$$

delta in relation to the upper left corner.

The same actions could be performed in case when the contours differ in height.

In an illustrative embodiment of this technical solution, in the case where the first contour is larger in width and the second one in height, the contours are aligned in width using at least the following displacement options: 0, $$\frac{delta}{2},$$

delta in relation to the upper left corner and then they are compared, so that the first contour lies inside the other one. Accordingly, the maximum difference in height/width can be 2 pixels, therefore, displacements, for example, in 0, 1 and 2 pixels are considered, while the contour that is larger in width/height is clipped according to the corresponding size of the smaller contour, that is, if the difference between the contours was 2 pixels wide, then the large contour is clipped in three ways: 2 pixels on the right; by 1 pixel on the left and on the right; and 2 pixels on the left. Then, when comparing the obtained contours, the similarity score (1) is calculated, and if the contours are similar, one of them is removed. Moreover, in this case, if in any of 9 overlays the score is less than the threshold, then the contours are considered to be similar.

Then, the method proceeds to step 240.

Step 240 Pairwise Comparing the Identified Contours and Cluster Contours, and in Response to the Fact that the Similarity Score has Exceeded the Threshold Value, Combining the Visual Content Image, Comprising the Compared Contours, with the Cluster, Otherwise, Creating a New Cluster for this Visual Content Image.

At step 240 the identified contours and contours belonging to the clusters are pairwise compared, and if the similarity score (1) exceeds the threshold value, the visual content image is added to the cluster; if the score does not exceed the threshold value, then a new cluster is created for this visual content image.

In non-limiting embodiments of the present technique, the clusters are formed groups of images associated with web resources based on the similarity of the identified unique contours (boxes).

In non-limiting embodiments, the cluster structure is at least a collection of immediate images of the visual content associated with a reference to it, and also the contours identified in the image, while additionally for each contour in the cluster, time of its last match and the number of subsequent mismatches are stored when adding a new image to the cluster.

As an illustrative example, as mentioned previously, after adding the first image of the visual content 300 to the cluster, all the contours highlighted therein become the cluster contours. Then, when adding an image of the visual content 400, the contours 302, 303, . . . 314 match with the contours identified in the image 300, and time of their match is assigned to them. Number 1, which indicates that this contour has not matched when adding a new image to the cluster once, is assigned to the contour 301, and the contours 401, 402, 403 are added to the cluster contours. Then, when adding an image of visual content 500 to this cluster, the contours 301, 302, 303, 306, 307, 308, 311, 312, 313 are assigned to new time of their match, and for the contours 304, 305, 309, 310, 314, 401, 402, 403 the mismatch counter is increased by one; with the contour 501 being added to the cluster contours.

In accordance with this technical solution, after pairwise sequential comparison of visual content images, in case of exceeding the threshold value, a contour is added to the cluster, and in the described case all new contours, corresponding to the image of the visual content associated with the cluster, are added to the database 122. In this case, exceedance of a preset threshold value by the similarity score P (1) is considered to be a match.

By way of example, but not limited to, with reference to FIG. 3, 4, 5, the method 200 starts its operation by processing the first image of the visual content illustrated in FIG. 3, then, as mentioned above, the said image is processed, identifying contours on it. After that, the identified contours are pairwise compared with the cluster contours (at the described moment the cluster contours are absent in the database 122 and their counter is set to 0), and a new cluster is created comprising the visual content image illustrated in FIG. 3, since the similarity score is P (1) in none of the cases does not exceed the similarity threshold value. In this case, the created cluster comprises an image of visual content, a reference to it, and also all the contours identified in the image, namely 301, 302 . . . 312. Then, the method proceeds to clustering the second visual content image illustrated in FIG. 4. It is worth noting that this visual content image has identical contours with the cluster formed earlier based on processing of the first visual content image (302 . . . 313). Number of matching contours of the web resource 400 and contours of the cluster created on the basis of the visual content image of the web resource 300 exceeds the allowable threshold, which means that the image of the web resource 400 is added to the cluster, while the contours 401, 402 identified only for the web resource 400 are added to the cluster contours.

An embodiment of this technical solution is possible, in which the processor 121 is configured to process each contour in the multithreading mode, namely to find in the database 122 all contours, which difference in size does not exceed a preset number of pixels, for example, two pixels in width and/or height, and to form many similar contours from them.

Accordingly, in embodiments of the described technique at least two tables are formed in the database 122, wherein the first table includes information on the number of images in which each of the contours identified in the visual content images was detected, to each available cluster, and the second table shows the total number of contours included in each cluster. Based on the information contained in the formed tables, the clusters, in which the total number of matching contours is less than 85% of the number of visual content image contours associated with it, are deselected (removed). In this case, if after removal there are more than fifteen clusters subject to further verification, then, fifteen clusters with the largest number of matches are selected from them.

Exemplary variants of the above tables are given below, namely Table 1, which includes the information about belonging of each identified contour to each of the clusters, and Table 2, containing information about the total number of contours in each cluster. It is also worth noting that the specific data in Tables 1 and 2 are given for illustrative purposes only, instead of these data there could be any other numerical values obtained when performing the method 200, among other things, the tables may contain other numbers of rows and columns.

TABLE 1

|  | Cluster 1 | Cluster 2 | Cluster N |
| --- | --- | --- | --- |
| Contour 1 | 3 | 5 | 10 |
| Contour 2 | 7 | 8 | 9 |
| Contour 3 | 0 | 1 | 1 |

TABLE 2

|  | Cluster 1 | Cluster 2 | Cluster N |
| --- | --- | --- | --- |
| Total number of contours associated with the cluster | 70 | 90 | 40 |

In an embodiment of the present technical solution, further, in the multithreading mode, the contours of each cluster stored in the database 122 and the contours of the analyzed visual content image are additionally compared, while combining the matched contours and highlighting all the clusters comprising the matched contours in accordance with Table 1.

Moreover, at this step, in order to add a visual content image to the cluster, each of the contours identified in the image is compared in multithreading mode with each of the contours present in different clusters.

In possible embodiments of this method, calculating a threshold for adding a visual content image to the cluster (or combining several clusters) is performed as follows:

finding (min) minimum number of contours in the combined objects, that is, the smallest of two numbers: the number corresponding to the number of contours in the visual content image, and the number corresponding to the number of contours in the given cluster, if min≤2, then the computing device 120 could output a warning message about the undescriptive image, and in this case, a new image of the visual content is not added to the cluster;

2<min<5, then, in order to add a visual content image to a specific cluster, it is required that all the contours in the image and contours in the cluster are matched;

5≤min≤10, then, in order to add a visual content image to a specific cluster, it is required that at least 50% of the min contours in the image and contours in the cluster are matched, 10<min≤15, then, in order to add a visual content image to a specific cluster, it is required that at least 25% of the min contours in the image and contours in the cluster are matched, min>15, then, in order to add a visual content image to a specific cluster, it is required that at least 20% of the min contours in the image and contours in the cluster are matched.

It is worth noting that the cluster is created only from the visual content images in which at least three contours are identified.

In embodiments of the present solution, it is possible to assign a visual content image to several clusters, with adding it to the cluster with the highest number of contour matches.

Besides, this embodiment provides for verifying a possibility of combining the identified clusters.

It is worth noting that in possible embodiments of this technical solution, the steps of clusters combining are similar to the steps of adding an image of the web resource visual content to a cluster, with the difference that the contours of two clusters are compared pairwise, and, if the threshold is exceeded, the clusters are combined. Accordingly, all the contours of the first cluster are compared with all the contours of the second one, while there could be only one match for each contour, that is, if the contour of the first cluster matches with the contour of the second cluster, these contours are not considered in further comparisons.

The method 200 proceeds to step 250.

Step 250 Storing References to Web Resources, which Visual Content Images were Found to Belong to the Same Cluster, in the Database.

Then, the references to web resources, which visual content images during the above analysis were found to belong to the same cluster, are stored in the database 122 of the computing device 120. In other words, at this step, the information about what namely web resources belong to one and the same subset of the presumably phishing web resources is stored in the database.

In the other embodiment, the clusters identified and stored in the database could then be transmitted to external devices (not shown in the figures) for further attribution of phishing web resources, web resource mirrors, blocked or illegal websites.

It is worth noting that in the additional embodiment of this technique, after clustering all the visual content images, the clusters comprising less than the specified number of images, for example, for better understanding, less than three images of visual content, are deleted. Such images are entered into a special list stored in the database 122, and are temporarily considered as "garbage", undescriptive.

Then, at least once per certain period of time, set in the system 100, a list from 1 to N of all remaining "garbage" images of visual content and their corresponding contours is obtained for filtering undescriptive images of web resources.

After filtering, an additional matrix is created for the remaining visual content images in the list from 1 to N in the database, in which the remaining "garbage" images from 1 to N are represented both in rows and columns, and number of matching contours is filled in at the intersection of rows and columns. The generated adjacency matrix is used for identifying a list of unique pairs of contours similar in size and associated with the images by the device 120.

Table 3 shows a non-limiting example of generation of an additional matrix as exemplified in Table 3. It is also worth noting that the specific data in Table 3 are given for illustrative purposes only, instead of this data there could be any other numerical values obtained when performing the method 200, among other things, the matrix may contain other numbers of rows and columns.

TABLE 3

|         | Image 1 | Image 2 | Image N |
|---------|---------|---------|---------|
| Image 1 | 0       | 19      | 12      |
| Image 2 | 19      | 0       | 5       |
| Image N | 12      | 5       | 0       |

In a non-limiting embodiment of the present technique, after the device 120 has identified a list of similar-sized contours, the contours comprised in the list are compared in multiple threads, and only the most similar pairs of contours are left. The information about contours intersection is entered into the matrix stored in the database 122 for those visual content images which these contours belong to.

In this case, for each unique pair of images contained in the list, for example, with reference to Table 3, for image 1 and image 2, the contours are superimposed on each other to identify the number of similar pairs of contours and, if in some contours pair the contours are similar to each other, then, in the initially generated matrix, where everything is filled with 0, the number in the corresponding cell is increased by 1. In this example, as can be seen from Table 3, 19 similar pairs of contours have been found for this pair of images.

Then, in order to confirm the association of web resource pairs based on pairs of their visual content images, the matrix is checked line by line, while transforming it into the adjacency matrix. If the number of contours matched in each pair of images exceeds a preset threshold, one is put down in the corresponding cell of the matrix. If the number of matched contours is less than a preset threshold, zero is put down in the corresponding cell. A non-limiting example of the transformed adjacency matrix, shown above in Table 3, and processed in this way at the threshold value of 10 is shown in Table 4.

TABLE 4

|         | Image 1 | Image 2 | Image N |
|---------|---------|---------|---------|
| Image 1 | 0       | 1       | 1       |
| Image 2 | 1       | 0       | 0       |
| Image N | 1       | 0       | 0       |

In non-limiting embodiments of this technique the strongly connected components of the adjacency matrix are further calculated. In fact, at this step, a maximally connected subgraph is constructed, where any vertex is reachable from any other graph vertex. Actually, the methods for calculating the strongly connected components of the adjacency matrix are well known in graph theory; however, any of these methods can be used for implementation of this technique.

In a non-limiting embodiment of this technique, the Tarjan algorithm with modifications of Nuutil or non-recursive Tarjan algorithm is used to determine the strongly connected components.

Each such constructed subgraph forms a new cluster of visual content images. Additionally, it is worth noting that a cluster constructed from "garbage" images of visual content is added to previously constructed clusters as an equivalent one. In this case, visual content images remained in the list of "garbage" images remain there until they are entered into one of new clusters constructed of "garbage" images.

Figure 7:
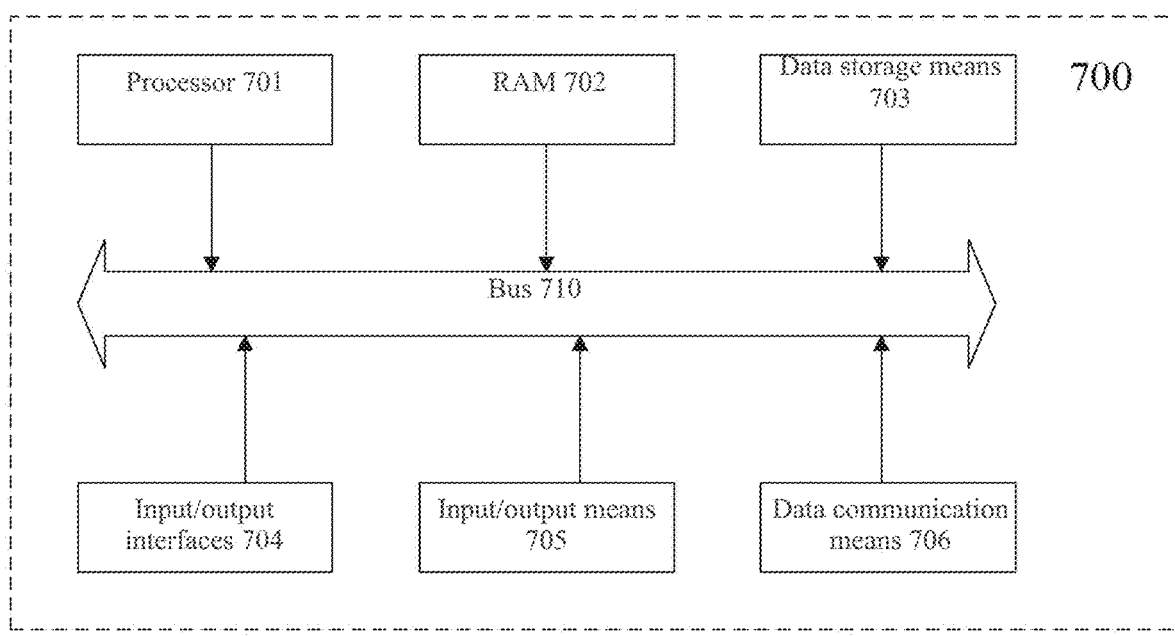
FIG. 7 illustrates a simplified schematic diagram of one of non-limiting embodiments of a computing device for implementation of this technical solution.

FIG. 7 hereafter illustrates a schematic diagram of the computer device (700) processing the data required for embodiment of the claimed solution.

In general, the device (700) comprises such components as: one or more processors (701), at least one memory (702), data storage means (703), input/output interfaces (704), input/output means (705), networking means (706).

The device processor (701) executes main computing operations, required for functioning of the device (700) or functionality of one or more of its components. The processor (701) runs the required machine-readable commands, comprised in the random-access memory (702).

The memory (702), typically, is in the form of RAM and comprises the necessary program logic ensuring the required functionality.

The data storage means (703) could be in the form of HDD, SSD, RAID, networked storage, flash-memory, optical drives (CD, DVD, MD, Blue-Ray disks), etc.

Interfaces (704) are standard means for connection and operation with server side, e.g. USB, RS232, RJ45, LPT, COM, HDMI, PS/2, Lightning, FireWire, etc. Selection of interfaces (704) depends on the specific device (700), which could be a personal computer, mainframe, server cluster, thin client, smartphone, laptop, etc.

As input/output means (705) there could be used: keyboard, joystick, display (touch-screen display), projector, touch pad, mouse, trackball, light pen, loudspeakers, microphone, etc.

Networking means (706) are selected from a device providing network data receiving and transfer, e.g. Ethernet-card, WLAN/Wi-Fi module, Bluetooth module, BLE module, NFC module, IrDa, RFID module, GSM modem, etc. Making use of the means (705) provides an arrangement of data exchange through wire or wireless data communication channel, e.g. WAN, PAN, LAN, Intranet, Internet, WLAN, WMAN or GSM.

The components of the device (700) are interconnected by the common data bus (710).

The application materials have represented the preferred embodiment of the claimed technical solution, which shall not be used as limiting the other particular embodiments, which are not beyond the claimed scope of protection and are obvious to persons skilled in the art.

The claimed method for clustering phishing content improves accuracy of clustering a set of web resources into groups, that further allows an expert to perform runtime checking of each saved group and to identify groups of phishing sites, for example, created with the use of phishing kits, identify mirrors and copies of blocked and previously identified malicious web resources, identify the authors of a phishing kit or the owner(s) of a phishing web resource. This significantly reduces the load on an expert when identifying malicious web resources.

Modifications and improvements of the above embodiments of this technical solution will be obvious to those skilled in the art. The foregoing specification is provided by way of example only and is not intended to be limiting in any way. Thus, the scope of this technical solution is limited only by the scope of the attached claims.

The invention claimed is:

1. A method for clustering phishing web resources based on visual content image thereof, the method being executed on a computer device comprising at least one processor and a memory, the method comprising:
receiving references to a plurality of phishing web resources;
retrieving, for a given phishing web resource of the plurality of phishing web resources, at least one image of a visual content of given phishing web resource;
analyzing the at least one image of the visual content associated with the given phishing web resource, the analyzing comprising:
identifying, in the at least one image, contours of elements of the visual content of the given phishing web resource;
identifying, among the contours, identical contours;
removing the identical contours from further consideration;
wherein the analyzing further comprises, in response to determining that a given pair of contours differ in at least one of height and width by two pixels or less:
superimposing the given pair of contours within the at least one image for calculating a per-pixel difference between the given pair of contours;
determining, for the per-pixel difference, a similarity value as an arithmetic mean of pixel values from each one of Red, Green, and Blue (RGB) channels in accordance with an equation:

$$P = \frac{\sum_{k=1}^{N} Ri + \sum_{k=1}^{N} Gi + \sum_{k=1}^{N} Bi}{N};$$

where Ri, Gi, Bi is an i-th pixel value in the Red, Green, and Blue channels, respectively, and N is a total number of image pixels in the per-pixel difference; and
if the similarity value does not exceed 7, removing the given pair of contours from further consideration;
conducting pairwise comparison of the identified contours associated with the given phishing resource and stored contours of stored images representative of stored web resources in stored clusters comprising, determining, for a given stored cluster of the stored clusters, a respective similarity value between the identified contours associated with the given phishing web resource and the stored contours of the given stored cluster,
in response to the respective similarity value associated with the given stored cluster exceeding a threshold value, adding the at least one image associated with the given phishing web resource to the given stored cluster;
in response to respective similarity values associated with each stored cluster of the stored clusters being lower than the threshold value, creating a new cluster for the at least one image associated with the given phishing web resource; and
storing, in the memory, data indicative of an association between the given phishing web resource and a respective cluster determined for the at least one image.

2. The method of claim 1, wherein the plurality of phishing web resources include at least two phishing web resources.

3. The method of claim 1, wherein the receiving the references to the plurality of phishing web resources comprises preliminary scanning a network to which the computing devices is communicatively coupled.

4. The method of claim 1, wherein the receiving the references to the plurality of phishing web resources comprises receiving the references from an external source via a data transmission network.

5. The method of claim 1, wherein the receiving the references to the plurality of phishing web resources comprises receiving the references from a preliminary-formed web resource database.

6. The method of claim 1, wherein the identifying the contours of the elements comprises identifying contours of at least one of: logos, letter outlines, individual words, pictures, and forms.

7. The method of claim 1, wherein the identifying the contours comprises using at least one of: a Canny edge detector and a contour tracing algorithm.

8. The method of claim 1, wherein the analyzing further comprises additionally removing small-size, oblique and elongated contours.

9. The method of claim 1, wherein the identifying the identical contours comprises identifying similar contours that differ in at least one of height and width by no more than two pixels.

10. The method of claim 1, wherein the method further comprises calculating invariant visual hash functions for each of the identified contours in the visual content image.

11. The method of claim 1, wherein in response to the respective similarity value associated with the given stored cluster exceeding the threshold value, prior to the adding the at least one image of the visual content of the given phishing web resource to the given stored cluster, the method further comprises:
   determining a number of similar contours in the identified contours in the at least one image to the stored contours in the given stored cluster;
   in response to the number of the similar contours being less than two: rejecting the at least one image from adding to the given stored cluster; and
   generating a warning message about the at least one image being non-representative of the visual content of the given phishing web resource;
   in response to the number of the similar contours being from three to five adding the at least one image to the given stored cluster if all the similar contours of the at least one image match with the stored contours of the given stored cluster;
   in response to the number of the similar contours being from five to ten similar contours adding the at least one image to the given stored cluster if a half of the similar contours of the at least one image match with the stored contours of the given stored cluster;
   in response to the number of the similar contours being from ten to fifteen adding the at least one image to the given stored cluster if a quarter of the similar contours of the at least one image match with the stored contours of the given stored cluster; and
   in response to the number of the similar contours being at least fifteen adding the at least one image to the given stored cluster if at least a one-fifth of the similar contours of the at least one image match with the stored contours of the given stored cluster.

12. The method of claim 1, wherein the adding the at least one image of the given phishing web resource to the given stored cluster is executed if the given stored cluster contains a largest number of matched contours with the at least one image.

13. The method of claim 1, further comprising removing clusters containing less than three images.

14. The method of claim 13, wherein images contained in the removed clusters are additionally entered into a separate list and are temporarily considered as being undescriptive.

15. The method of claim 14, further comprising:
   generating an adjacency matrix based on each image from the separate list, and
   determining a number of matched contours between a given pair of images from the separate list as a value of the adjacency matrix located at an intersection.

16. The method of claim 15, further comprising in response to determining that the number of matched contours is less than a predetermined threshold replacing a corresponding value of the adjacency matrix with 1, else 0.

17. The method of claim 16, further comprising generating, based on the adjacency matrix, strongly connected graph components, each of which has more than two images, and creating a new cluster for each of the strongly connected graph components.

18. A computing device for clustering phishing content, the computing device comprising a memory for storing machine-readable instructions and at least one computing processor configured to execute machine-readable instructions, thereby causing the computing device to execute the method of claim 1.

* * * * *